(12) United States Patent
Tamura

(10) Patent No.: US 10,671,579 B2
(45) Date of Patent: Jun. 2, 2020

(54) INFORMATION PROCESSING APPARATUS AND STORAGE SYSTEM

(71) Applicant: FUJITSU LIMITED, Kawasaki-shi, Kanagawa (JP)

(72) Inventor: Masahisa Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1151 days.

(21) Appl. No.: 14/572,395

(22) Filed: Dec. 16, 2014

(65) Prior Publication Data

US 2015/0213068 A1 Jul. 30, 2015

(30) Foreign Application Priority Data

Jan. 27, 2014 (JP) ................................ 2014-012332

(51) Int. Cl.
G06F 16/20 (2019.01)
G06F 16/22 (2019.01)

(52) U.S. Cl.
CPC .................... *G06F 16/22* (2019.01)

(58) Field of Classification Search
CPC ........................ G06F 17/30312; G06F 17/30
See application file for complete search history.

(56) References Cited

U.S. PATENT DOCUMENTS

2006/0129588 A1* 6/2006 Hsu
2010/0325476 A1* 12/2010 Zhang ................. G06F 11/1662
714/4.1

FOREIGN PATENT DOCUMENTS

| JP | 2004-342042 | 12/2004 |
| JP | 2005-321922 | 11/2005 |
| JP | 2011-210059 A | 10/2011 |
| WO | 2013/108745 A1 | 7/2013 |

OTHER PUBLICATIONS

Japanese Office Action dated Jul. 4, 2017 for corresponding Japanese Patent Application No. 2014-012332, with Partial English Translation, 5 pages.

* cited by examiner

*Primary Examiner* — Kristopher Andersen
(74) *Attorney, Agent, or Firm* — Fujitsu Patent Center

(57) ABSTRACT

An index generation request reception unit configured to receive an index generation request for stored data from one or more information processing apparatuses, and a determination unit configured to determine whether an index of data is generated or not in accordance with identification information attached to the index generation request are provided, so that writing of an object is efficiently processed.

1 Claim, 13 Drawing Sheets

INFORMATION PROCESSING APPARATUS AND STORAGE SYSTEM

CROSS-REFERENCE TO RELATED APPLICATION

This application is based upon and claims the benefit of priority of the prior Japanese Patent application No. 2014-012332, filed on Jan. 27, 2014, the entire contents of which are incorporated herein by reference.

FIELD

The embodiment discussed herein is directed to an information processing apparatus, an index generation control method, and an index generation control program.

BACKGROUND

In recent years, a distributed object storage system made by connecting multiple servers via a network has been realized in order to accumulate a large amount of data.

In general, such distributed object storage generates an index for an object while the object is written.

The object referred to herein includes a combination of data and meta data accompanying the data. The index is made by collecting meta data of each object and holding the collected meta data in a data structure suitable for searching.

FIG. 9 is a figure schematically illustrating a configuration of a conventional distributed object storage system.

The distributed object storage system 500 includes a proxy server 501 and multiple servers 510. In the example as illustrated in FIG. 9, a reference numeral representing a server is a reference numeral 510 when it means any one of the servers, but when it is to identify a particular server of the multiple servers, reference numerals A to F are used to indicate the servers.

The proxy server 501 is connected to multiple servers 510 via a network, not illustrated, and is also connected to a client computer, not illustrated. The proxy server 501 performs data access to the server 510 on behalf of the client computer. The proxy server 501 is an information processing apparatus such as a computer having a server function.

The proxy server 501 has management information which is structured by associating the storage position of a data file with information for identifying the data file. When the proxy server 501 receives a read/write request from a client to a data file, the proxy server 501 refers to the management information on the basis of the received file name, and accesses the data file of the access target.

The proxy server 501 causes the server 510 to write an object, and causes any one of the servers 510 to generate an index.

For example, the proxy server 501 transmits an object (meta data and data) to the server A to cause the server A to write the object, and transmits meta data of the object to the server B to cause the server B to generate an index.

Subsequently, the server A which has written the object in accordance with the command given by the proxy server 501 transmits the object to the server C, and commands the server C to write the object. As a result, redundancy of the object is realized. Likewise, the server C which has written the object transmits the object to the server E and commands the server E to write the object. These server A, server C, and server E storing the objects may be referred to as object processing servers.

On the other hand, the server B which has received a generation command of an index from the proxy server 501 uses the meta data received together with the generation command of the index to generate the index. Subsequently, the server B which has generated the index transmits the meta data to the server D to command the server D to generate an index. As a result, redundancy of the index is realized. The server D which has generated the index transmits the meta data to the server F to command the server F to generate an index. These server B, server D, and server F generating the indexes may be referred to as index generation servers.

FIG. 10 is a sequence diagram illustrating processing during writing of objects in a conventional distributed object storage system.

After the object is written to the server A in accordance with the command given by the proxy server 501, an object is written to the server C in accordance with the command given by the server A. Thereafter, the object is written to the server E in accordance with a command given by the server C.

On the other hand, in the server B, an index is generated in accordance with a command given by the proxy server 501, and thereafter, the server D generates an index in accordance with the command given by the server B. Thereafter, the server F generates an index in accordance with the command given by the server D.

However, in the conventional distributed object storage system as described above, when failure occurs in any one of the processing, there may be a case where it is not possible to maintain consistency between "an object is accumulated" and "an index for the object is generated".

FIG. 11 is a sequence diagram illustrating processing during writing of objects in a conventional distributed object storage system, and indicates the state when the proxy server 501 fails.

In the example as illustrated in FIG. 11, the proxy server 501 fails after the proxy server 501 gives the server A a write command of an object but before the proxy server 501 gives the server B a generation command of an index.

As a result, each of the servers A, C, E accumulates the objects, but the servers B, D, F do not generate any index. More specifically, this causes inconsistency between the accumulate state of the object and the index.

FIG. 12 is a sequence diagram illustrating processing during writing objects in a conventional distributed object storage system, and illustrates an example where the server A fails.

In the example as illustrated in FIG. 12, the server A fails after the proxy server 501 gives the server A a write command of an object. The proxy server 501 gives the server B a generation command of an index.

As a result, each of the servers B, D, F generates an index, but because the server A fails, the servers C, E do not perform writing of objects. More specifically, in this case, there is also inconsistency between the accumulate state of the object and the index.

In order to prevent occurrence of such inconsistency between the accumulate state of the object and the index in the distributed object storage system, each server that has done writing of an object may transmit a generation command of an index.

FIG. 13 is a figure illustrating processing during writing of objects in an improved example of a conventional distributed object storage system.

In the example as illustrated in FIG. 13, a server A, a server C, and a server E which have written objects in a conventional distributed object storage system 500 as illustrated in FIG. 9 transmit meta data of the object to the server B to cause the server B to generate the index.

As a result, even if the proxy server 501 fails after the proxy server 501 gives the server A a write command of an object but before the proxy server 501 gives the server B a generation command of an index, the index is generated. More specifically, in the distributed object storage system 500, the consistency between the accumulate state of the object and the index can be maintained.

The server A which has received the write command of the object from the proxy server 501 transmits the write command of the object to the server C, and thereafter gives the server B a generation command of an index.

As a result, when the server A fails before the server A transmits the write command of the object to the server C, neither the object is written nor the index is generated in the distributed object storage system 500, and therefore, the consistency between the accumulate state of the object and the index is maintained. When the server A fails after the server A transmits the write command of the object to the server C but before the server A transmits the generation command of the index to the server B, the server C and the server E which have written the object gives the server B the generation command of the index. As a result, the consistency between the accumulate state of the object and the index is maintained.

It should be noted that the server B which has received the generation command of the index uses the meta data received together with the generation command of the index to generate the index.

Subsequently, the server B which has generated the index transmits the meta data to the server D to command the server D to generate the index, and further, the server D which has generated the index commands the server F to generate the index.

[Patent Literature 1] Japanese Laid-open Patent Publication No. 2005-321922

[Patent Literature 2] Japanese Laid-open Patent Publication No. 2004-342042

In the conventional distributed object storage system as illustrated in FIG. 13, however, each of the index servers B, D, F generates the index in accordance with the generation command of the index received from the object processing server. More specifically, the index servers B, D, F perform redundant index generation processing, and therefore, there is a problem in that unnecessary index processing is done, which is inefficient.

SUMMARY

According to an aspect of the embodiments, an information processing apparatus is an information processing apparatus connected to a storage system configured by connecting a plurality of information processing apparatuses having storage apparatuses via a network, and the information processing apparatus includes an index generation request reception unit configured to receive an index generation request for stored data from one or more of the information processing apparatuses and a determination unit configured to determine whether an index of the data is to be generated or not in accordance with identification information attached to the index generation request.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
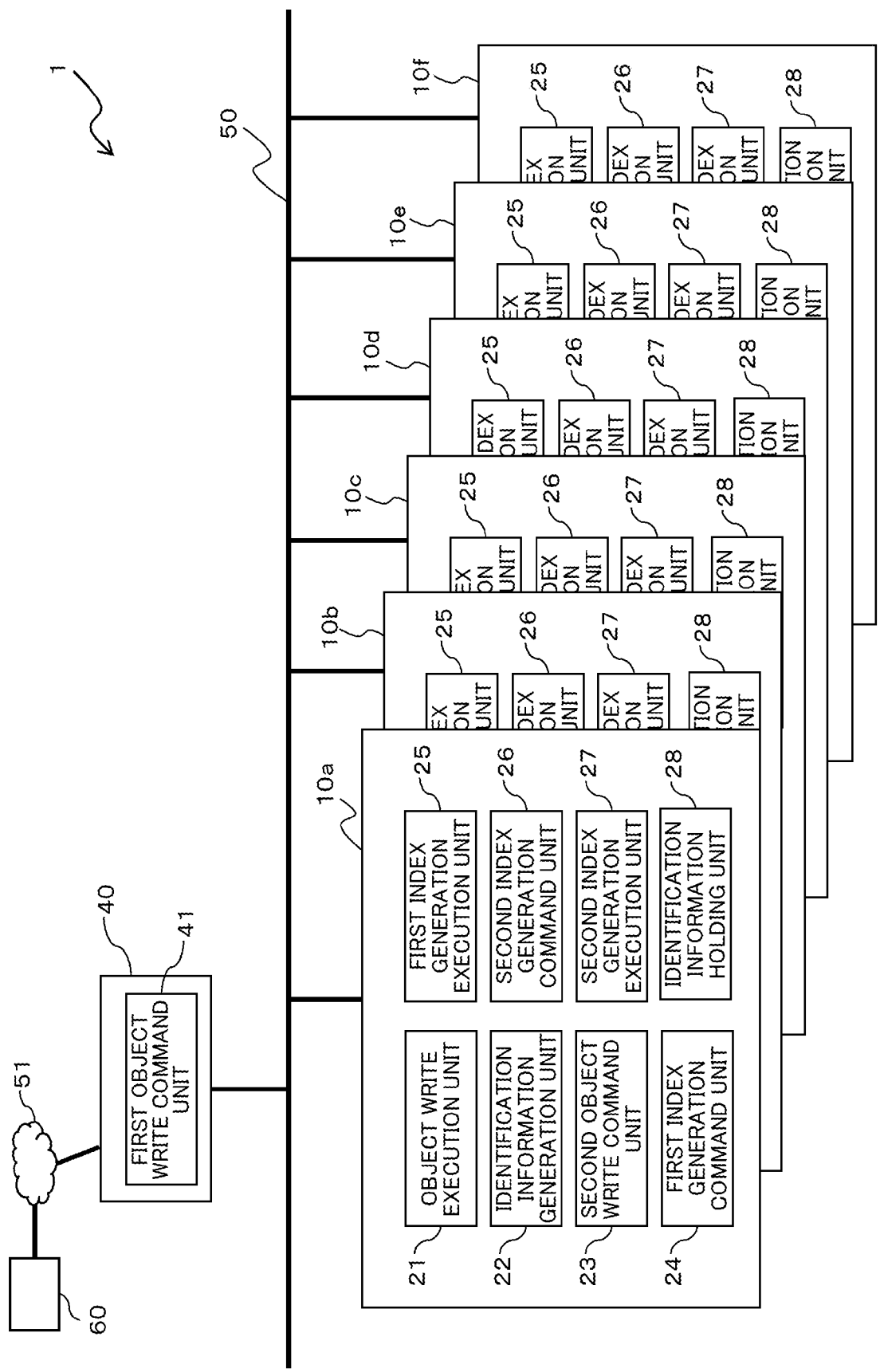
FIG. 1 is a figure schematically illustrating a functional configuration of a distributed storage system serving as an example of embodiment.

Hereinafter, an embodiment according to the information processing apparatus, the index generation control method, and the index generation control program will be explained with reference to drawings. However, the embodiment described below is merely an example, and it is not to be understood that various kinds of modifications and technical applications not illustrated in the embodiment are excluded. More specifically, the present embodiment can be carried out by making various modifications (such as combining the embodiment and each modification) without deviating from the gist thereof. Each of the drawing is not intended to be provided with only the constituent elements illustrated in the drawing. Instead, other functions and the like may also be included.

(A) Configuration

Figure 2:
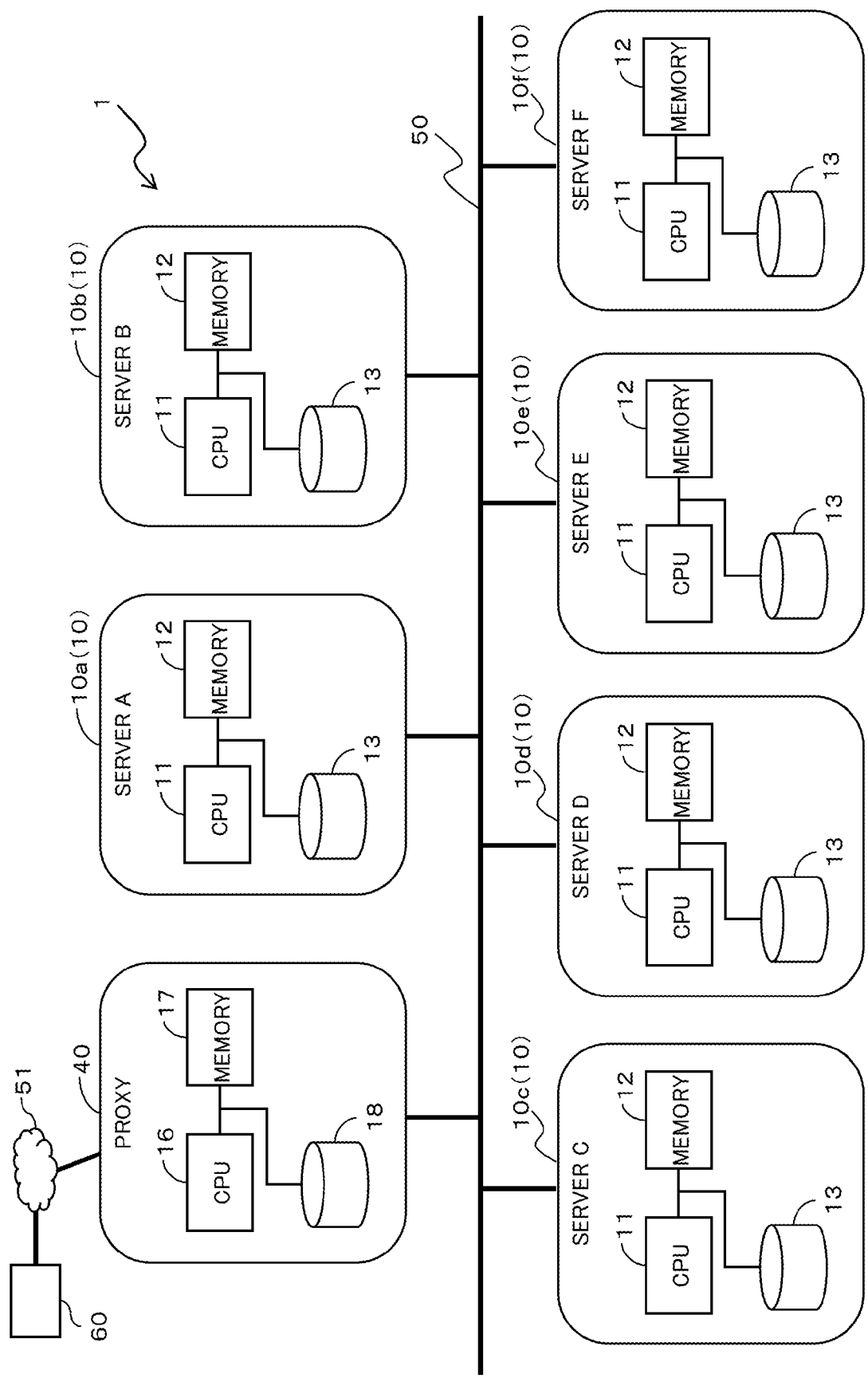
FIG. 2 is a figure illustrating a hardware configuration of the distributed storage system serving as an example of embodiment.

FIG. 1 is a figure schematically illustrating a functional configuration of a distributed storage system serving as an example of embodiment. FIG. 2 is a figure illustrating a hardware configuration thereof.

As illustrated in FIG. 2, a distributed storage system 1 is a distributed object storage system that includes a proxy server 40, a client 60, and multiple servers (six servers in the example illustrated FIGS. 1) 10a to 10f.

In the example as illustrated in FIG. 2, the servers 10a to 10f and the proxy server 40 are connected via, for example, a Local Area Network (LAN) 50 so as to be able to communicate with each other. The proxy server 40 and the client 60 are connected via a network 51 such as a public network so as to be able to communicate with each other.

The distributed storage system 1 can combine disk spaces possessed by the multiple servers 10a to 10f so that the disk spaces can be treated as if it is a single storage. In the distributed storage system 1, multiple data files are arranged in the multiple servers 10a to 10f in a distributed manner.

For example, the client 60 is an information processing apparatus such as a personal computer, and gives a request (read/write request) for reading and writing a data file (file) stored in the servers 10a to 10f via the proxy server 40. In the example as illustrated in FIG. 2, the single client 60 is provided in the distributed storage system 1. However, the embodiment is not limited thereto. Alternatively, two or more clients 60 may be provided.

For example, the client 60 transmits data, which are to be written, as well as a write request to the proxy server 40.

The proxy server 40 performs data access to the server 10 instead of the client 60. The proxy server 40 is an information processing apparatus such as a computer having a server function. In the example as illustrated in FIGS. 1 and 2, the single proxy server 40 is provided in the distributed storage system 1. However, the embodiment is not limited thereto. Alternatively, two or more proxy servers 40 may be provided.

As illustrated in FIG. 2, the proxy server 40 includes a Central Processing Unit (CPU) 16, a memory 17, and a storage apparatus 18.

The storage apparatus 18 is a storage apparatus such as a Hard Disk Drive (HDD) and a Solid State Drive (SSD), and is to store various kinds of data.

The memory 17 is a storage apparatus including a Read Only Memory (ROM) and a Random Access Memory (RAM). Software program for proxy control and data and the like for the program are written to the ROM of the memory 17. The software program on the memory 17 is read and executed by the CPU 16. The RAM of the memory 17 is used as a temporary storage memory or a working memory.

The CPU 16 is a processing device for performing various kinds of controls and computations, and achieves various kinds of functions by executing the Operating System (OS) and programs stored in the memory 17. More specifically, as illustrated in FIG. 1, the CPU 16 achieves the function for the first object write command unit 41.

The first object write command unit 41 is to command a server 10 to write an object, and transmits a write command as well as an object to the server 10.

For example, the proxy server 40 includes a management information configured such that the storage position of a data file is associated with information for identifying the data file (for example, a file name). When the first object write command unit 41 receives a write request to a data file from the client 60, the first object write command unit 41 refers to the management information on the basis of the received file name, and confirms the storage location of the data file of the access target.

The proxy server 40 transmits an object as well as a write request to the server 10 corresponding to the storage location of the data file. More specifically, when the write request is given by the client 60, the proxy server 40 writes the object to the target server 10.

The object is a combination of data and meta data accompanying the data.

When the proxy server 40 receives a reply to the read/write request from the server 10, the proxy server 40 transfers the reply to the client 60 which is the source of transmission of the read/write request. It should be noted that the function for the proxy server 40 can be realized by various kinds of methods already known, and the details thereabout are omitted.

Hereinafter, in the present embodiment, an example in which the proxy server 40 commands the server A to write an object will be described.

The servers 10a to 10f are information processing apparatuses each having a storage apparatus 13, and has a storage server function for storing file data to the storage apparatus 13. More specifically, each of the servers 10a to 10f functions as the storage server node. Each of the servers 10a to 10f has the same configuration as each other.

Hereinafter, when it is to identify a particular server of the multiple servers, reference numerals 10a to 10f are used as a reference numeral representing a server when it is to identify a particular server of the multiple servers, but when it means any one of storage server nodes, reference numeral 10 is used. Hereinafter, the server 10a may also be referred to as a server A. Likewise, the server 10b may also be referred to as a server B, the server 10c may also be referred to as a server C, the server 10d may also be referred to as a server D, the server 10e may also be referred to as a server E, and the server 10f may also be referred to as a server F.

Each server 10 has an object processing function for writing an object to the storage apparatus 13 and an index processing function for generating an index of an object, and when an object is written, an index therefor is generated.

Hereinafter, a server 10 realizing the object processing function may be referred to as an object processing server 10, and a server 10 realizing the index processing function may be referred to as an index processing server 10.

As illustrated in FIG. 2, the server 10 includes a CPU 11, a memory 12, and a storage apparatus 13.

The storage apparatus 13 is a storage apparatus for storing various kinds of data and programs, and is, for example, an HDD or an SSD. For example, the storage apparatus 13 may be configured as Redundant Arrays of Inexpensive Disks (RAID) using multiple storage apparatuses.

The memory 12 is a storage apparatus including a ROM and a RAM. The software program for the object processing control and data and the like for the program are written to the ROM of the memory 12. The software program on the memory 12 is read and executed by the CPU 11 as. The RAM of the memory 12 is used as a temporary storage memory or a working memory. Further, the RAM of the memory 12 stores, as processing history, identification information about meta data on which index generation is done by the first index generation execution unit 25 explained later. More specifically, the memory 12 functions as the identification information holding unit (identification information storage unit) 28 as illustrated in FIG. 1.

The CPU 11 is a processing device for performing various kinds of controls and computations, and achieves various kinds of functions by executing the OS (Operating System) and programs stored in the memory 12.

The CPU 11 of the server 10 executes the control programs (an object storage control program and an index generation control program) as illustrated in FIG. 1, thus functioning as an object write execution unit 21, an identification information generation unit 22, a second object write command unit 23, a first index generation command unit 24, a first index generation execution unit 25, a second index generation command unit 26, and a second index generation execution unit 27.

The object write execution unit 21 performs processing to store an object to the storage apparatus 13. This object write execution unit 21 receives an object write command (a storage command of data) from the first object write command unit 41 of the proxy server 40 and the second object write command unit 23 of another server 10, and stores the object to the storage apparatus 13 in accordance with the command (causes the storage apparatus 13 to store the object). More specifically, the object write execution unit 21 not only functions as a storage command reception unit for receiving a storage command of data but also functions as a storage execution unit for storing data to the storage apparatus 13.

In particular, a server 10 receiving a write command of an object from the first object write command unit 41 of the proxy server 40 is referred to as a first object processing server 10. In the present embodiment, the server A (server 10a) is the first object processing server 10.

On the other hand, a server for receiving an object write command from the second object write command unit 23 of another server 10 will be referred to as a second object processing server 10. In the present embodiment, the server C (server 10c) and the server E (server 10e) are the second object processing servers 10.

The identification information generation unit 22 generates identification information, which is unique within the system, for the object writing commanded. More specifically, the identification information generation unit 22 generates identification information about the received storage command.

The identification information may be, for example, Universally Unique IDentifier (UUID). However, the identification information is not limited to UUID. For example, a combination of a time stamp and the Internet Protocol (IP) address of the client 60 which has given the write command may be used. Alternatively, a time stamp may be used in combination with UUID. When the time stamp is included in the identification information, it is expected to produce the effect of making the log easy to see.

The second object write command unit 23 transmits an object to another server 10 and commands the server 10 to write the object. The second object write command unit 23 attaches the identification information to the object write command to transmit the identification information.

More specifically, when the server 10 writes the object in accordance with a command given by the first object write command unit 41 of the proxy server 40, the second object write command unit 23 adds the identification information generated by the identification information generation unit 22 and commands another server 10 to write the object.

When the server 10 writes the object in accordance with a command given by the second object write command unit 23 of another server 10, the second object write command unit 23 adds the identification information received together with the write command of the object, and commands another server 10 to write the object.

It should be noted that the server 10 to which the write command of the object is given is determined in accordance with the object. For example, the server 10 to which the object is written is determined in advance in accordance with the logic structure and the path of the object, and is stored as a management table and the like in a predetermined area of the storage apparatus 13 or the memory 12 of each server 10. The second object write command unit 23 refers to the management table to identify the server 10 to which the write command of the object is transmitted.

The first index generation command unit 24 transmits the meta data of the object to another server 10 to command the server 10 to generate an index. More specifically, the first index generation command unit 24 functions as a transmission unit for transmitting an index generation request for requesting generation of an index of data to another server 10. The first index generation command unit 24 attaches the identification information to the index generation command (index generation request) to transmit the identification information.

More specifically, when the server 10 writes an object in accordance with the command given by the first object write command unit 41 of the proxy server 40, the first index generation command unit 24 adds the identification information generated by the identification information generation unit 22 and commands the another server 10 to generate the index.

When the server 10 writes the object in accordance with the command given by the second object write command unit 23 of another server 10, the first index generation command unit 24 adds the identification information received together with the write command of the object, and commands the another server 10 to generate the index.

The server 10 to which the generation command of the index is given is determined in accordance with the object. For example, the server 10 to which the generation command of the index is given is determined in advance in accordance with the logic structure and the path of the object, and is stored as a management table and the like in a predetermined area of the storage apparatus 13 or the memory 12 of each server 10. The first index generation command unit 24 refers to the management table to identify the server 10 to which the generation command of the index is transmitted.

Hereinafter, the server 10 to which the first index generation command unit 24 transmits the generation command of the index may be referred to as a first index processing server 10. In the present embodiment, the server B (server 10b) is the first index processing server 10.

On the other hand, a server 10 which receives the generation command of the index from another server 10 and which is other than the first index processing server 10b will be referred to as a second index processing server 10. In the present embodiment, the server D (server 10d) and the server F (server 10f) are the second index processing servers 10.

The first index generation execution unit 25 receives the generation command of the index given by the first index generation command unit 24 explained above, and generates the index in accordance with the index generation command. More specifically, the first index generation execution unit 25 uses the meta data transmitted together with the index generation command to generate the index.

More specifically, the first index generation execution unit 25 not only functions as an index generation request reception unit for receiving an index generation request of stored data from one or more servers 10 but also functions as an index generation unit for generating an index of data. It should be noted that the generation of the index can be realized using methods already known, and the explanation thereabout is omitted.

When the first index generation execution unit 25 generates the index, the identification information attached to the generation command of the index is stored to the identification information holding unit 28. Therefore, the object of which generation processing of the index has been finished (meta data) can be found by referring to the identification information holding unit 28. It should be noted that the identification information stored in the identification information holding unit 28 may be referred to as an identification information cache.

Further, when the first index generation execution unit 25 receives the generation command of the index from the first index generation command unit 24, the first index generation execution unit 25 refers to the identification information holding unit 28 before the generation of the index, and determines whether the identification information attached to the generation command of the index is included in the identification information cache. Then, the first index generation execution unit 25 generates the index in a case where the identification information attached to the generation command of the index is not held in the identification information holding unit 28. On the other hand, the first index generation execution unit (index generation inhibition unit) 25 inhibits generation of the index in a case where the identification information attached to the generation command of the index is held in the identification information holding unit 28.

More specifically, the first index generation execution unit 25 functions as a determination unit for determining whether the index of the data is to be generated or not in accordance with the identification information attached to the index generation request.

The second index generation command unit 26 transmits the meta data of the object to another server 10 and commands the server 10 to generate the index. The second index generation command unit 26 transmits the meta data of the object to the second index generation execution unit 27 of the another server 10, and commands the second index generation execution unit 27 of the another server 10 to generate the index.

The second index generation execution unit 27 generates the index in accordance with the generation command of the index given by the second index generation command unit 26 explained above. More specifically, the second index generation execution unit 27 generates the index by using the meta data transmitted together with the index generation command. The generation of the index can be realized using methods already known, and the explanation thereabout is omitted.

When the server 10 receives the object write command from the second object write command unit 23 or the first object write command unit 41 of the proxy server 40, the server 10 executes the object processing function to write the object to the storage apparatus 13. More specifically, the server 10 functions as the object processing server 10.

On the other hand, when the server 10 receives the index generation command from the first index generation command unit 24 or the second index generation command unit 26, the server 10 executes the index processing function for generating the index of the object. More specifically, the server 10 functions as the index processing server 10.

In the present embodiment, for example, the server A, the server C, and the server E function as the object processing server 10, and the server B, the server D, and the server F function as the index processing server 10.

(B) Operation

The write processing of the object in the distributed storage system 1 serving as an example of embodiment configured as described above will be explained using FIG. 3 with reference to FIG. 4.

Figure 3:
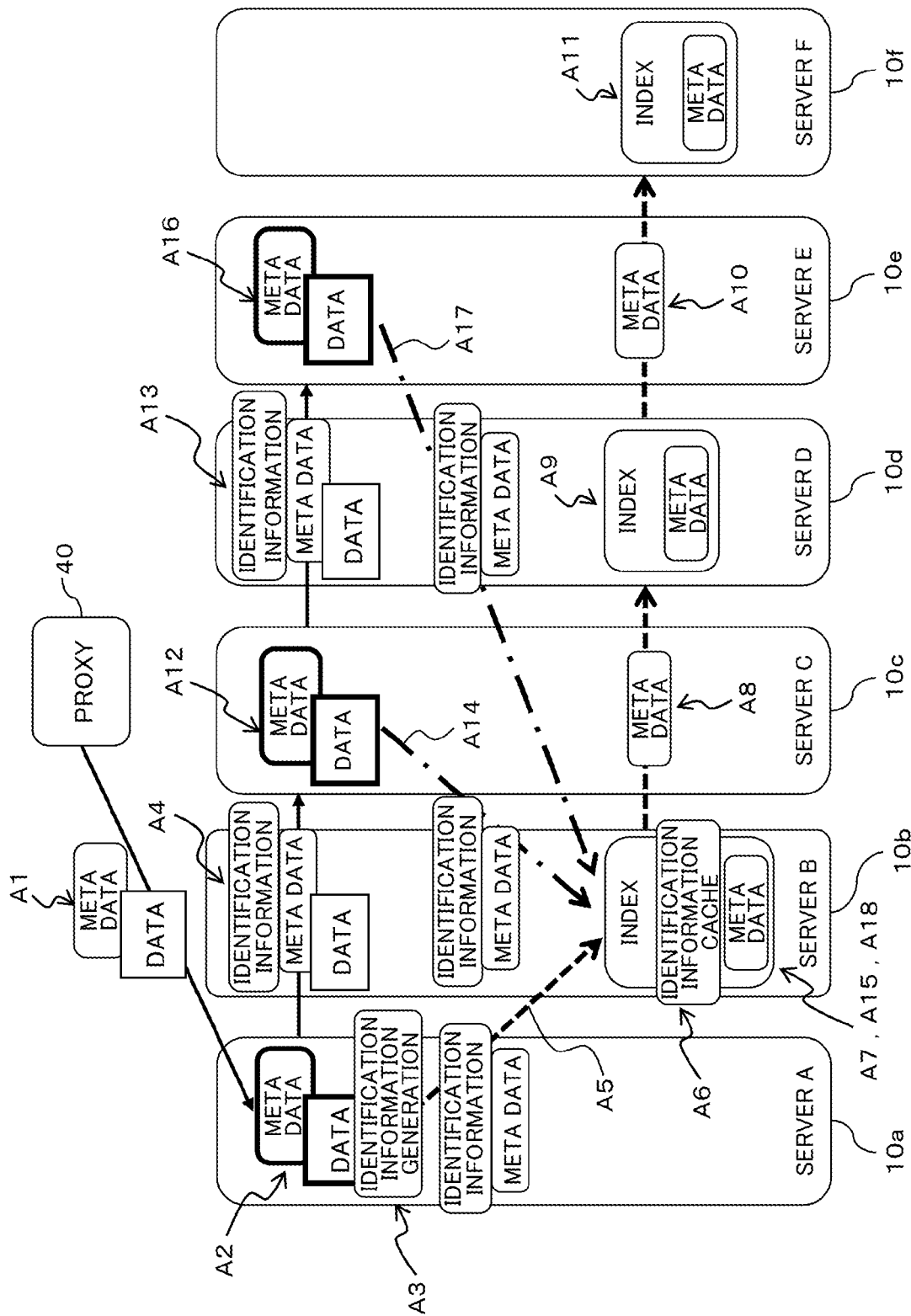
FIG. 3 is a figure for explaining write processing of objects in the distributed storage system serving as an example of embodiment.
Figure 4:
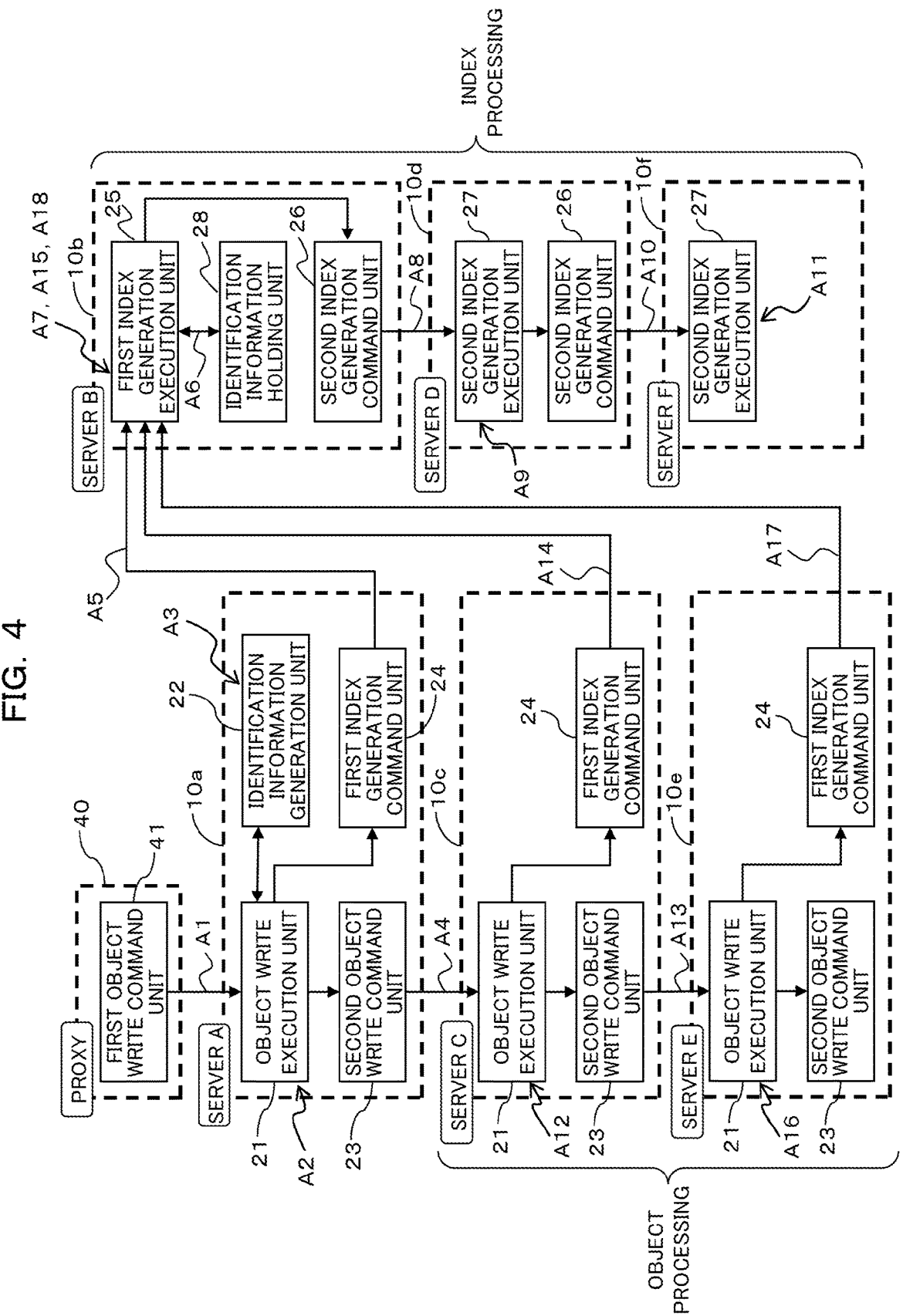
FIG. 4 is a figure illustrating an example of functional configuration of the distributed storage system serving as an example of embodiment.

FIG. 4 is a figure illustrating an example of functional configuration in the distributed storage system 1 serving as an example of embodiment, and illustrates a functional configuration for realizing the processing as illustrated in FIG. 3.

FIGS. 3 and 4 illustrate an example where the proxy server 40 causes the server A (first object processing server 10*a*) to write an object. The server A gives the server C a write command of an object, and further, the server C gives the server E the write command of the object.

For example, the server A gives the server B (first index processing server 10*b*) the generation command of the index. The server B gives the server D the generation command of the index. Further, the server D gives the server F the generation command of the index.

When the first object write command unit 41 of the proxy server 40 transmits the object (data and meta data) to the server A which is the write target (see reference numeral A1), the object write execution unit 21 of the server A writes the object to the storage apparatus 13 (see reference numeral A2). In the server A, the identification information generation unit 22 generates identification information in response to the writing of the object (see reference numeral A3). The second object write command unit 23 of the server A adds the generated identification information to the object and transmits the object to the server C, thus carrying out the write command of the object (see reference numeral A4).

The first index generation command unit 24 of the server A adds the generated identification information to the meta data of the object for the server B and transmits the meta data to the first index generation execution unit 25 of the server B, thus carrying out the generation command of the index (see reference numeral A5).

The first index generation execution unit 25 of the server B having received the generation command of the index refers to the identification information cache of the identification information holding unit 28, and determines whether the identification information attached to the meta data is stored in the identification information holding unit 28 or not (see reference numeral A6).

At this point in time, the same identification information as the received identification information is not stored in the identification information holding unit 28, and therefore, the first index generation execution unit 25 uses the meta data to generate the index (see reference numeral A7). The first index generation execution unit 25 having generated the index stores the identification information attached to the generation command of the index to the identification information holding unit 28.

Further, the second index generation command unit 26 of the server B transmits the meta data used for generation of the index to the server D, and commands the server D to generate the index (see reference numeral A8).

In the server D, the second index generation execution unit 27 uses the meta data transmitted together with the index generation command in response to the received index generation command to generate the index (see reference numeral A9). The second index generation command unit 26 of the server D transmits the meta data used for generation of the index to the server F, and commands the server F to generate the index (see reference numeral A10).

In the server F, the second index generation execution unit 27 uses the meta data transmitted together with the index generation command in response to the received index generation command to generate the index (see reference numeral A11).

As described above, the server B, the server D, and the server F execute the index generation function.

On the other hand, in the server C having received the write command of the object from the server A, the object write execution unit 21 stores the received object to the storage apparatus 13 (see reference numeral A12).

In the server C, the second object write command unit 23 adds the identification information attached to the received object to the object and transmits the object to the server E, thus carrying out the write command of the object (see reference numeral A13).

Further, the first index generation command unit 24 of the server C adds the identification information attached to the object to the meta data for the server B and transmits the meta data to the first index generation execution unit 25 of the server B, thus carrying out the generation command of the index (see reference numeral A14).

In the server B having received the generation command of the index from the server C, the first index generation execution unit 25 refers to the identification information cache of the identification information holding unit 28, and determines whether the identification information attached to the meta data is stored in the identification information holding unit 28 or not (see reference numeral A15).

The same identification information as the received identification information is stored in the identification information holding unit 28, and therefore, the first index generation execution unit 25 discards the generation command of the index having the identification information attached thereto, and does not generates the index. More specifically, the generation of the index is inhibited.

Therefore, the server B which is the first index processing server 10 is inhibited from generating a redundant index. The first index processing server 10b does not transmit the generation command of the index for the server D and the server F which are the second index processing servers 10, and therefore, these second index processing servers 10 are inhibited from generating unnecessary index.

In the server E having received the write command of the object from the server C, the object write execution unit 21 stores the received object to the storage apparatus 13 (see reference numeral A16).

Further, the first index generation command unit 24 of the server E adds the identification information attached to the object to the meta data for the server B, and transmits the meta data to the first index generation execution unit 25 of the server B, thus carrying out the generation command of the index (see reference numeral A17).

In the server B having received the generation command of the index from the server E, the first index generation execution unit 25 refers to the identification information cache of the identification information holding unit 28, and determines whether the identification information attached to the meta data is stored to the identification information holding unit 28 or not (see reference numeral A18).

The same identification information as the received identification information is stored to the identification information holding unit 28, and therefore, the first index generation execution unit 25 discards the generation command of the index having the identification information attached thereto, and does not generates the index. More specifically, the generation of the index is inhibited.

Therefore, the server B which is the first index processing server 10 is inhibited from generating a redundant index.

The first index processing server 10b does not transmit the generation command of the index for the server D and the server F which are the second index processing servers 10, and therefore, these second index processing servers 10 are inhibited from generating unnecessary index.

Figure 5:
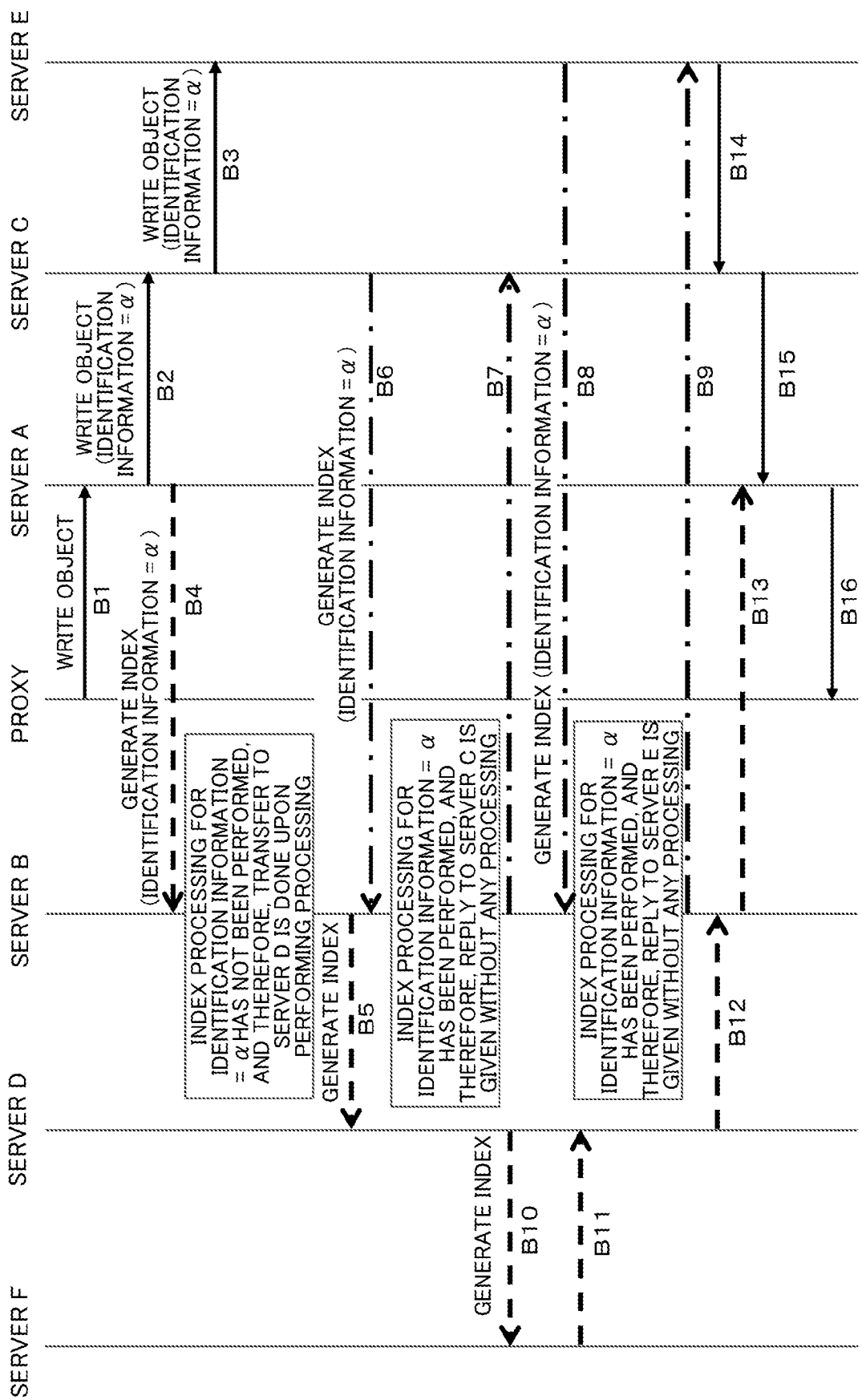
FIG. 5 is a sequence diagram illustrating write processing of objects in the distributed storage system serving as an example of embodiment.

FIG. 5 is a sequence diagram illustrating write processing of the object in the distributed storage system 1 serving as an example of embodiment.

The proxy server 40 transmits the write command of the object to the server A which is the first object processing server 10 (see reference numeral B1). The server A writes the object to the storage apparatus 13. The server A generates identification information (in the example as illustrated in FIG. 5, identification information=α) in response to the writing of this object. It should be noted that α indicates any given numerical value or character string.

The server A transmits the write command of the object having the identification information (=α) attached thereto to the server C (see reference numeral B2). The server C writes the object to the storage apparatus 13 in response to the write command.

The server C having written the object transmits the write command of the object having the identification information (=α) attached thereto to the server E (see reference numeral B3). The server E writes the object to the storage apparatus 13 in response to the write command.

The server A having given the write command of the object to the server C transmits the generation command of the index having the identification information (=α) attached thereto to the server B (see reference numeral B4).

The server B refers to the identification information cache of the identification information holding unit 28, and determines whether the identification information attached to the generation command of the index is stored in the identification information holding unit 28 or not.

At this point in time, the same identification information as the received identification information is not stored in the identification information holding unit 28, and therefore, the server B uses the meta data received from the server A to generate the index. The server B stores the identification information attached to the generation command of the index received to the identification information holding unit 28.

Further, the server B transmits the meta data used for generation of the index to the server D, and commands the server D to generate the index (see reference numeral B5).

The server C having written the object also transmits the generation command of the index to the server B (see reference numeral B6). The index generation command from the server C also has the identification information (=α) attached thereto.

The server B having received the index generation command from the server C refers to the identification information cache of the identification information holding unit 28, and determines whether the identification information (=α) attached to the generation command of the index from the server C is stored in the identification information holding unit 28 or not.

At this point in time, the received identification information (=α) is already stored in the identification information holding unit 28. More specifically, for the object writing process of the identification information=α, the index has already been generated. Therefore, the server B does not follow the generation command of the index given by the server C and having the identification information (=α) attached thereto, which means that the server B does not generate the index. However, the server B sends a completion notification to the server C which is the source of transmission of the generation command of the index (see reference numeral B7).

Likewise, the server E having written the object also transmits the generation command of the index to the server B (see reference numeral B8). The index generation command from the server E also has the identification information (=α) attached thereto.

The server B having received the index generation command from the server E refers to the identification information cache of the identification information holding unit 28, and determines whether the identification information (=α) having the generation command of the index attached thereto from the server E is stored in the identification information holding unit 28 or not.

At this point in time, the received identification information (=α) is already stored in the identification information holding unit 28. More specifically, for the object write processing of the identification information=α, the index has been generated. Therefore, the server B does not follow the generation command of the index given by the server E and having the identification information (=α) attached thereto, which means that the server B does not generate the index. However, the server B sends a completion notification to the server E which is the source of transmission of the generation command of the index (see reference numeral B9).

The server D having received the generation command of the index from the server B uses the received meta data to generate the index. The server D transmits the meta data used for generation of the index to the server F, and commands the server F to generate the index (see reference numeral B10).

The server F having received the generation command of the index from the server D uses the received meta data to generate the index. The server F replies the completion notification of the index generation to the server D (see reference numeral B11). Likewise, the server D replies the completion notification of the index generation to the server B, and the server B replies the completion notification of the index generation to the server A (see reference numerals B12, B13).

The server E having written the object replies the completion notification about the object write to the server C (reference numeral B14). Likewise, the server C replies the completion notification of writing of the object to the server A (reference numeral B15). When the server A receives the completion notification of writing of the object from the server C and the completion notification of the index generation from the server B, the server A replies the completion notification to the proxy server 40 (see reference numeral B16).

(C) Advantages

As described above, according to the distributed storage system 1 serving as an example of embodiment, in the first object processing server 10 having received the write command of the object from the proxy server 40 (for example, server 10a), the identification information generation unit 22 generates identification information, unique within the system, for the writing of the object commanded.

Then, this first object processing server 10a attaches the generated identification information to the write command of the object, and transmits it to another server 10 (a second object processing server, for example, the server 10c). Likewise, this first object processing server 10a attaches the identification information to the index generation command, and transmits it to a first index processing server 10 (for example, the server 10b).

Each second object processing server 10 (for example, server 10c, 10e) having received the write command of the object from the first object processing server 10a writes the object. The second object processing servers 10c, 10e transmit the received identification information as well as the generation command of the index to the first index processing server 10b (server B).

The first index processing server 10b having received the index generation command uses the identification information transmitted with the generation command of the index to refer to the identification information holding unit 28, thus determining whether the index of the object associated with the identification information is already generated or not.

Then, the first index processing server 10b is inhibited from generating the index in a case where the identification information attached to the generation command of the index is stored in the identification information holding unit 28, and more specifically, in a case where the index of the object associated with the identification information is already generated.

Therefore, the server B which is the first index processing server 10 is inhibited from generating a redundant index, so that the load can be alleviated. The first index processing server 10b does not transmit the generation command of the index to the server D and the server F which are the second index processing servers 10, and therefore, these second index processing servers 10 are inhibited from generating unnecessary index. This also alleviates the loads of the server D and the server F. Therefore, the write processing of the object can be done efficiently.

The proxy server 40 gives the write command of the object to the first object processing server 10 (for example, the server 10a). Then, the first object processing server 10a having received the write command of the object gives the write command of the object to another server 10 (second object processing servers, for example, the servers 10d, 10f), and gives the generation command of the index to the first index processing server 10b.

Figure 6:
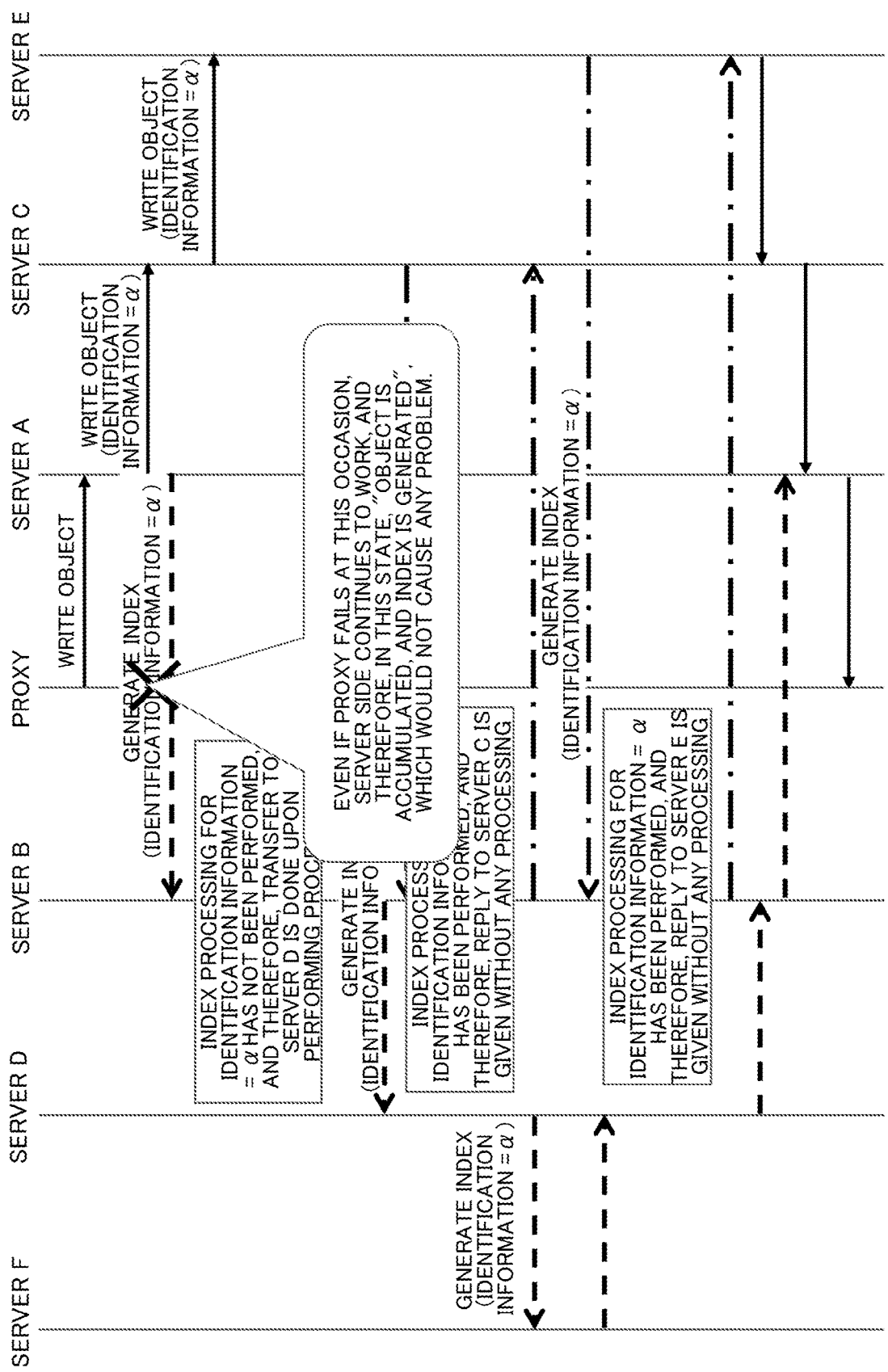
FIG. 6 is a sequence diagram illustrating write processing of objects in the distributed storage system serving as an example of embodiment.

FIG. 6 is a sequence diagram illustrating write processing of the object in the distributed storage system serving as an example of embodiment, and in FIG. 6, the state where the proxy server fails is added to the sequence diagram of FIG. 5. The same processing as what has been explained in the above explanation in FIG. 6 is the same as what has been explained with reference to FIG. 5, and the explanation thereabout is omitted.

As illustrated in FIG. 6, even when the proxy server 40 fails after giving the write command of the object to the server A, the first object processing server 10a (server A) transmits the write command of the object to the second object processing server 10c (server C). The server A transmits the generation command of the index to the first index processing server 10b (server B).

Therefore, the distributed storage system 1 executes writing (accumulation) of the object and generation of the index, and the consistency between the accumulate state of the object and the index is maintained in the distributed storage system 1.

Figure 7:
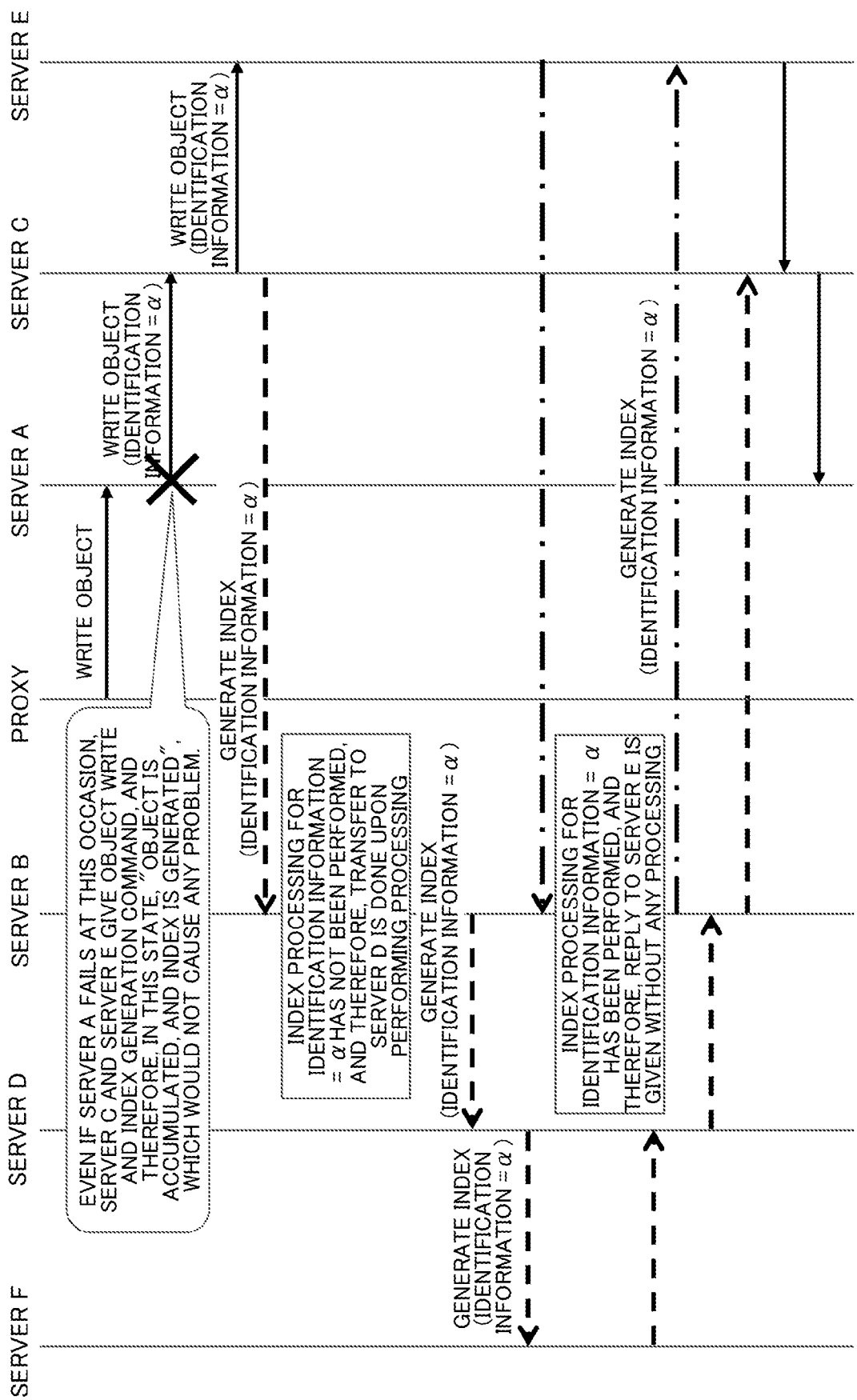
FIG. 7 is a sequence diagram illustrating write processing of objects in the distributed storage system serving as an example of embodiment.

FIG. 7 is also a sequence diagram illustrating write processing of objects in the distributed storage system serving as an example of embodiment, and in FIG. 7, a part of the sequence diagram of FIG. 5 is extracted and illustrated, and in FIG. 7, the state where the server A fails is added. The same processing as what has been explained in the above explanation in FIG. 7 is the same as what has been explained with reference to FIG. 5, and the explanation thereabout is omitted.

In the example as illustrated in FIG. 7, the server A fails after the server A gives the write command of the object to another server (the second object processing server) C but before the server A gives the index generation command to the first index processing server 10*b*.

When the server A fails at this point in time, the server A does not transmit the generation command of the index to the server B. However, each of the server C and the server E transmits the generation command of the index to the server B.

Therefore, the distributed storage system 1 executes writing (accumulation) of the object and generation of the index, and the consistency between the accumulate state of the object and the index is maintained in the distributed storage system 1.

Figure 8:
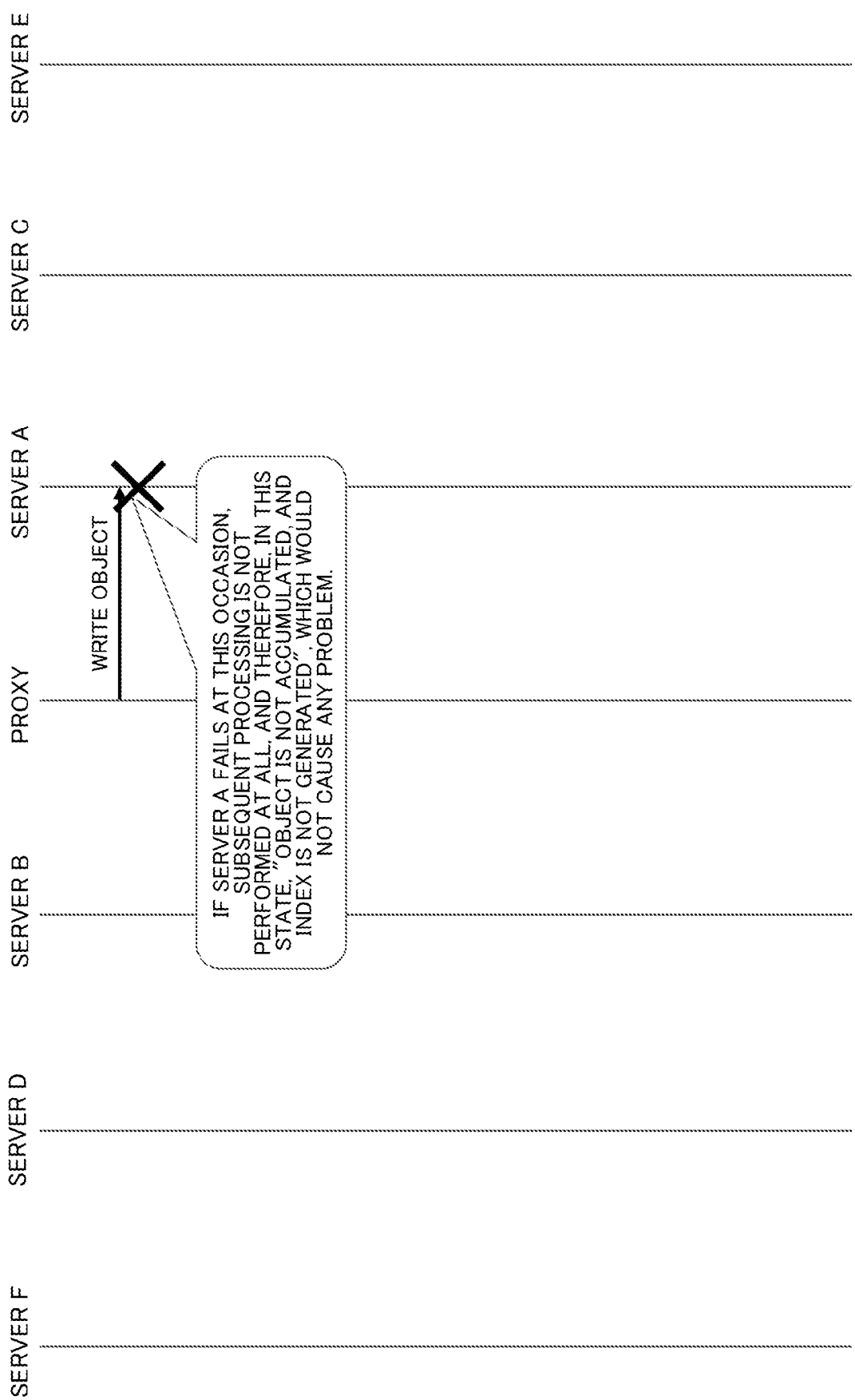
FIG. 8 is a sequence diagram illustrating write processing of objects in the distributed storage system serving as an example of embodiment.
Figure 9:
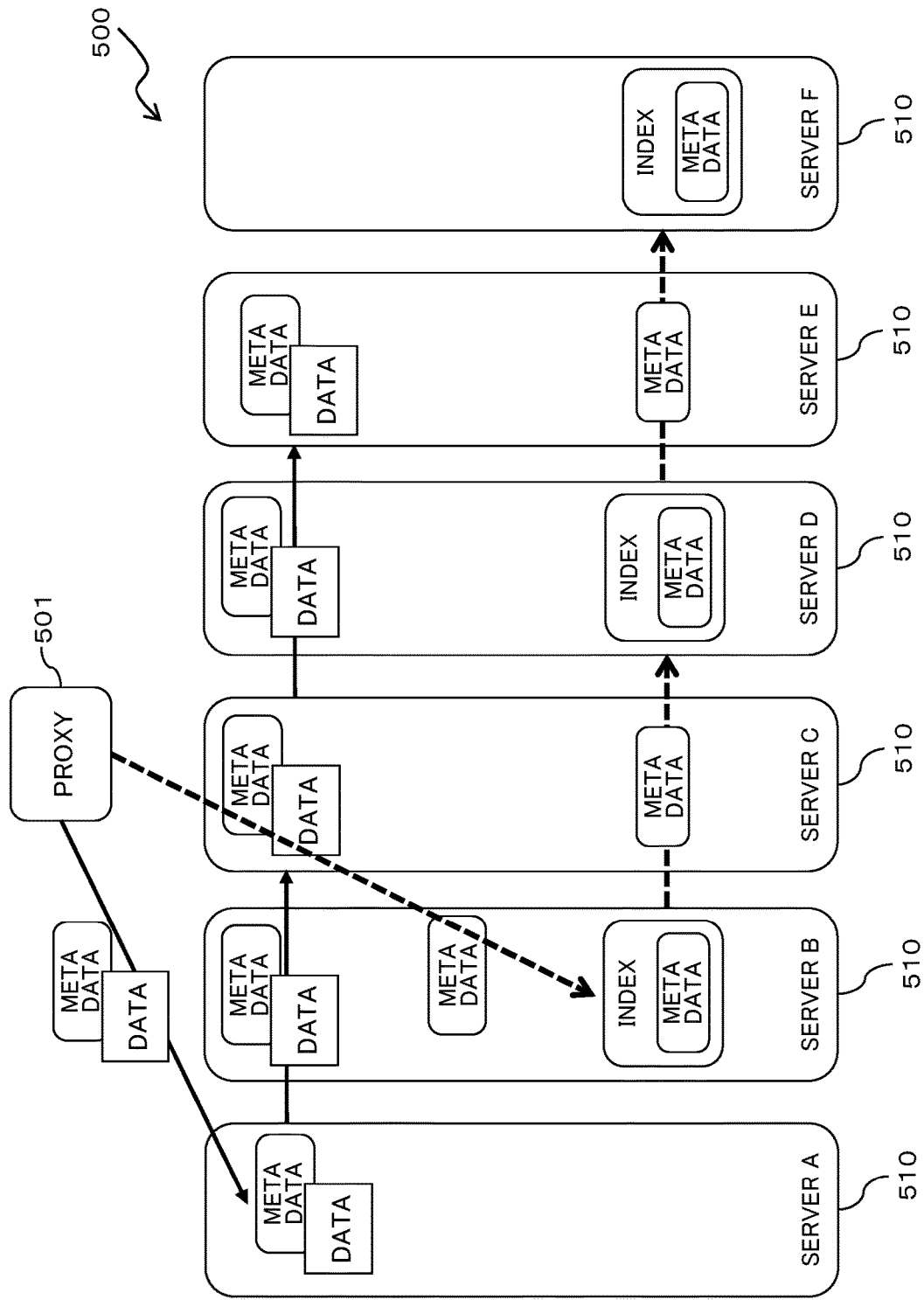
FIG. 9 is a figure schematically illustrating a configuration of a conventional distributed object storage system.
Figure 10:
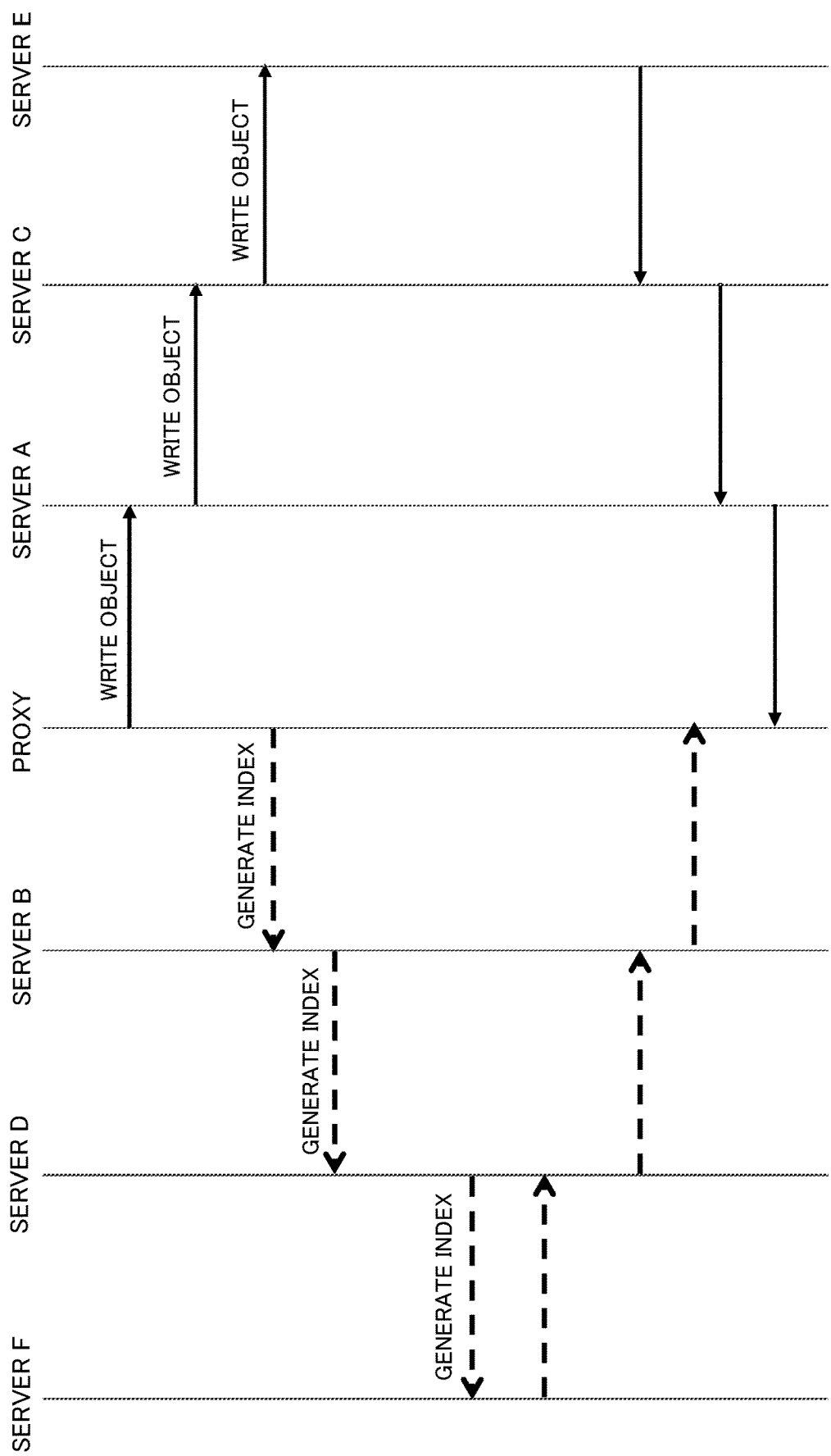
FIG. 10 is a sequence diagram illustrating processing during writing of objects in a conventional distributed object storage system.
Figure 11:
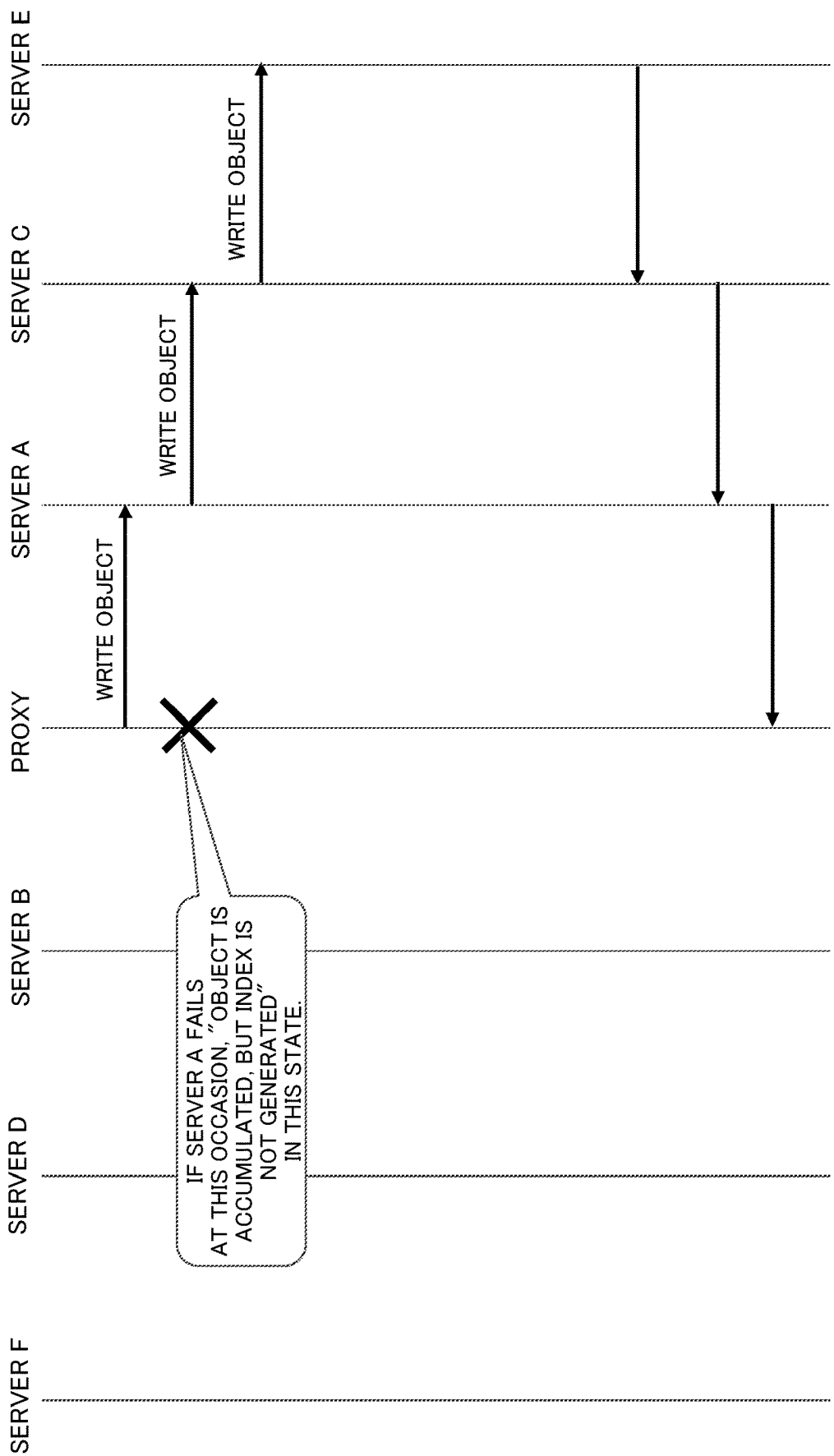
FIG. 11 is a sequence diagram illustrating processing during writing of objects in a conventional distributed object storage system.
Figure 12:
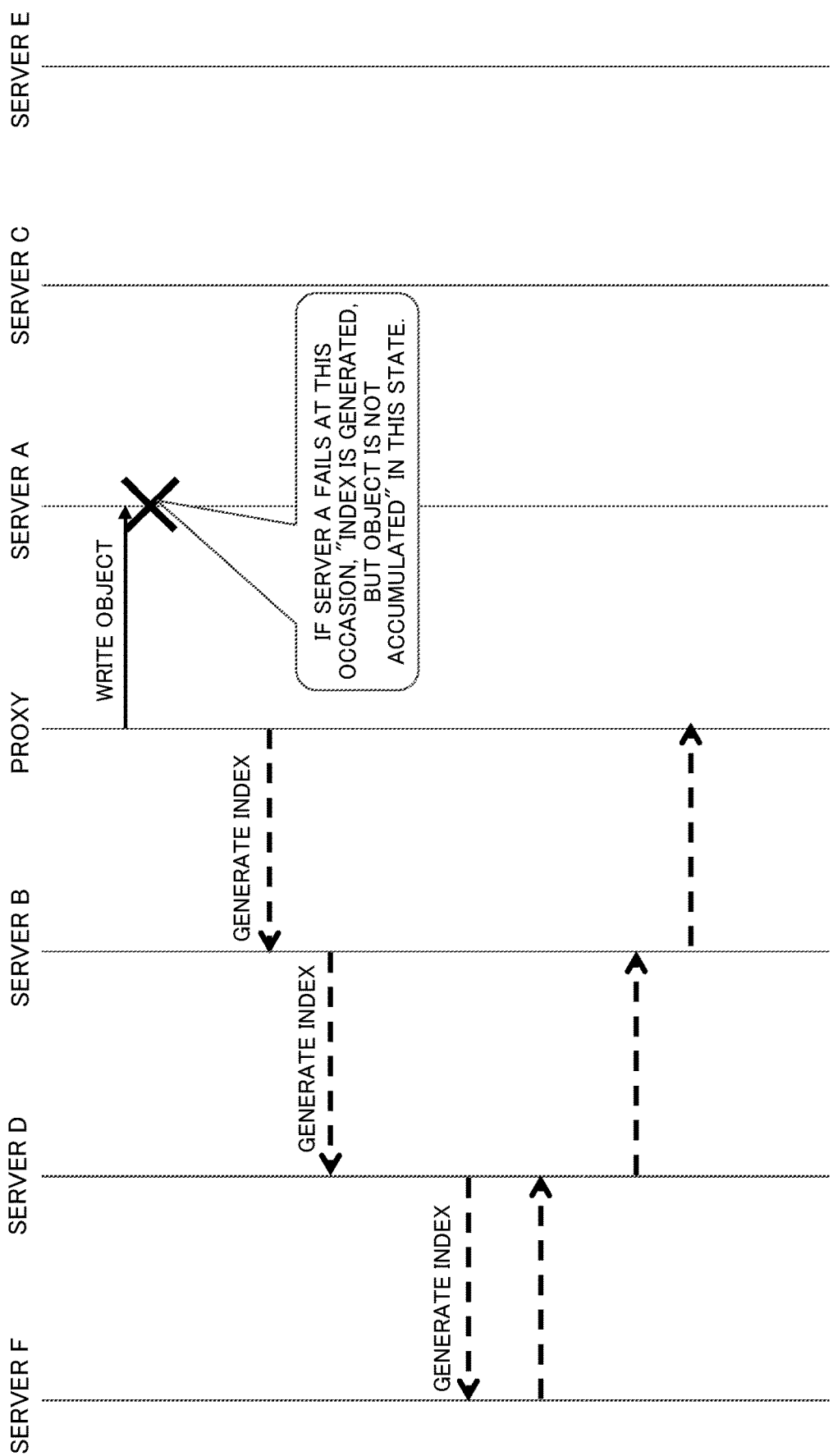
FIG. 12 is a sequence diagram illustrating processing during writing of objects in a conventional distributed object storage system.
Figure 13:
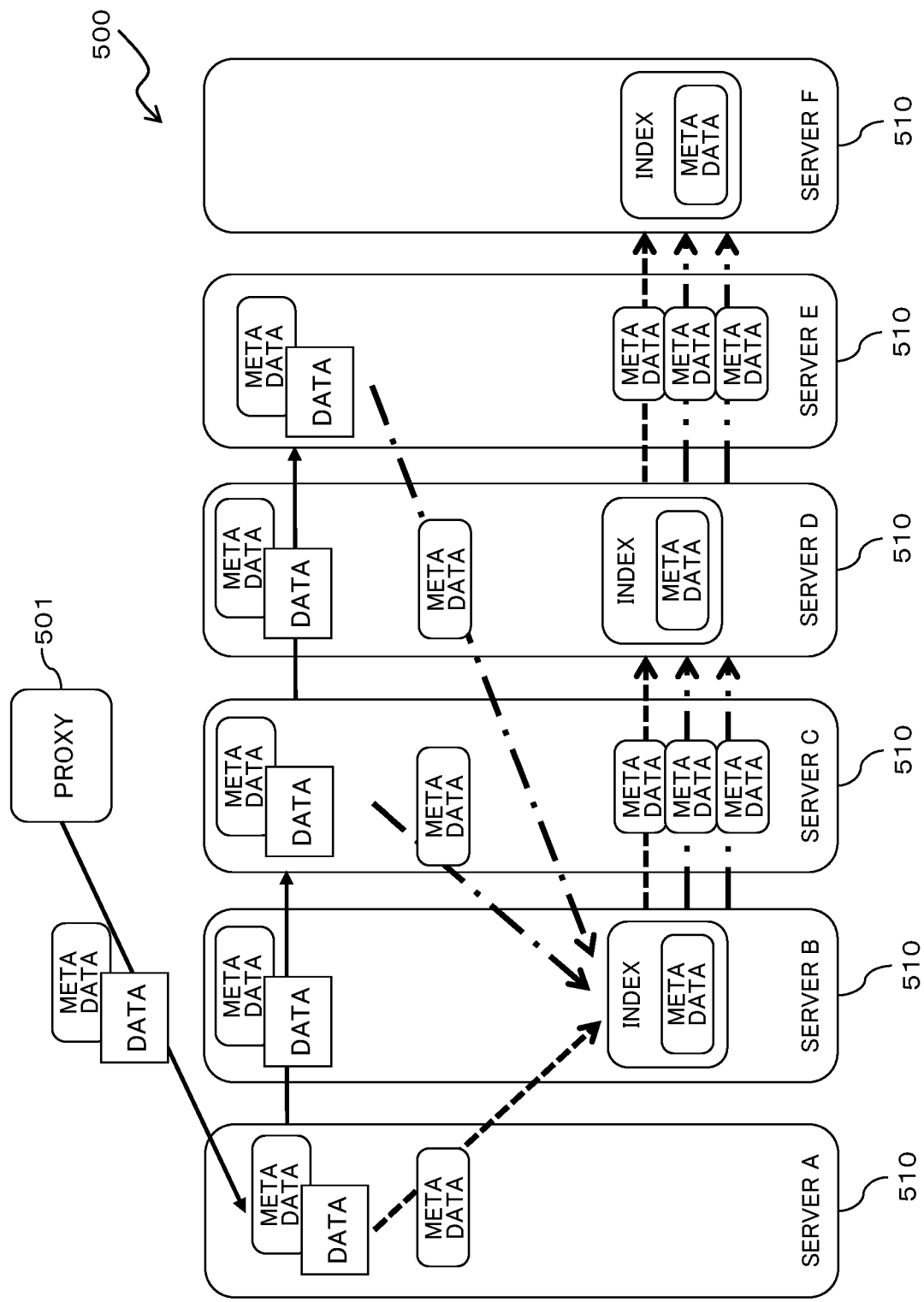
FIG. 13 is a sequence diagram illustrating processing during writing of objects in an improved example of a conventional distributed object storage system.

FIG. 8 is also a sequence diagram illustrating write processing of objects in the distributed storage system serving as an example of embodiment, and in FIG. 8, the state where the server A fails is added.

In the example as illustrated in FIG. 8, after the proxy server 40 gives the write command of the object, the server A fails before the server A transmits the write command of the object or the generation command of the index.

When the server A fails at this point in time, the distributed storage system 1 executes neither writing (accumulation) of the object nor generation of the index. Therefore, in the distributed storage system 1, "any object is not accumulated, and any index is generated", so that the consistency between the accumulate state of the object and the index is maintained.

(D) Others

Programs for realizing the functions of the object write execution unit 21, the identification information generation unit 22, the second object write command unit 23, the first index generation command unit 24, the first index generation execution unit 25, the second index generation command unit 26, and the second index generation execution unit 27 in the server 10 explained above are provided in such form that the programs are recorded on a computer-readable recording medium such as a flexible disk, a CD (CD-ROM, CD-R, CD-RW, and the like), DVD (DVD-ROM, DVD-RAM, DVD-R, DVD+R, DVD-RW, DVD+RW, HD, DVD, and the like), a Blu-ray disk, a magnetic disk, an optical disk, a magneto-optical disk, and the like.

Likewise, programs for realizing the functions of the first object write command unit 41 in the proxy server 40 explained above are also provided in such form that the programs are recorded on a computer-readable recording medium such as a flexible disk, a CD (CD-ROM, CD-R, CD-RW, and the like), DVD (DVD-ROM, DVD-RAM, DVD-R, DVD+R, DVD-RW, DVD+RW, HD, DVD, and the like), a Blu-ray disk, a magnetic disk, an optical disk, a magneto-optical disk, and the like.

Then, the computer reads a program from the recording medium, and transfers an internal storage apparatus or an external storage apparatus and stores the program therein to use the program. The program may be recoded to a storage apparatus (recording medium) such as a magnetic disk, an optical disk, a magneto-optical disk, and the like, so that the program may be provided to the computer from the storage apparatus via a communication path.

When the server 10 realizes the functions of the object write execution unit 21, the identification information generation unit 22, the second object write command unit 23, the first index generation command unit 24, the first index generation execution unit 25, the second index generation command unit 26, and the second index generation execution unit 27, the program stored in an internal storage apparatus (the memory 12 in the present embodiment) is executed by a microprocessor of the computer (the CPU 11 in the present embodiment). At this occasion, the program recorded to the recording medium may be read and executed by the computer.

Likewise, when the proxy server 40 realizes the functions of the first object write command unit 41, the program stored in an internal storage apparatus (the memory 17 in the present embodiment) is executed by a microprocessor of the computer (the CPU 16 in the present embodiment). At this occasion, the program recorded to the recording medium may be read and executed by the computer.

The disclosed technique is not limited to the embodiment explained above. The technique may be modified in various manners and carried out without deviating from the gist of the present embodiment.

For example, in the above embodiment, six serves 10 are provided in the distributed storage system 1, but the technique is not limited thereto. Alternatively, five or less servers 10 or seven or more servers 10 may be provided.

In the above embodiment, for example, the server A, the server C, and the server E function as the object processing servers 10. The server B, the server D, and the server F function as the index processing servers 10. However, the technique is not limited thereto, and may be changed and carried out as necessary.

Further, in the server 10, it is not necessary to separate the object processing servers 10 and the index processing servers 10. The servers may function as not only the object processing servers 10 but also the index processing servers 10.

In the embodiment explained above, for example, the server A is the first object processing server 10, and the server B is the first index processing server 10. However, the technique is not limited thereto, and may be changed and carried out as necessary.

Further, in the embodiment explained above, for example, the client 60 is connected via the network 51 to the proxy server 40, and each server 10 and the proxy server 40 are connected via the LAN 50, but the technique is not limited thereto.

For example, the client 60 and the proxy server 40 may be provided in the same housing, the client 60 and any one of the servers 10 may be provided in the same housing. Further, the proxy server 40 and any one of the servers 10 may be provided in the same housing. The client 60, the proxy server 40, and the server 10 may be connected via a communication path other than the LAN 50 and the network 51.

The client 60 may have the function for serving as the proxy server 40. Any one of the servers 10 may have the function for serving as the proxy server 40. More specifically, the client 60 or any one of the servers 10 may have the function for serving as the first object write command unit 41. Further, the client 60 may have the function for serving as any one of the servers 10.

Further, the present embodiment may be carried out and produced by a person skilled in the art on the basis of the above disclosure.

According to an embodiment, the object writing can be processed effectively.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage system comprising a plurality of object processing servers, a first index processing server, and one or more second index processing servers, connected to each other via a network and having storage apparatuses, each of the plurality of the object processing servers, the first index processing server, and the second index processing servers comprising a processor and a memory coupled to the processor, wherein the processor of a first object processing server included in the plurality of the object processing servers executes operation of:

receiving a storage command of data;

storing the data to a storage apparatus included in the first object processing server;

generating identification information about the storage command received;

transmitting an index generation request for requesting generation of an index of the data to the first index processing server, the index generation request having the identification information attached thereto; and attaching the identification information to the storage command and transmit the storage command to one or more second object processing servers included in the plurality of the object processing servers, the processor of each of the second object processing servers executing operation of:

receiving the storage command of data having the identification information attached thereto and transmitted from the first object processing server;

storing the data to the storage apparatus included in each of the second object processing servers; and transmitting an index generation request having the received identification information attached thereto to the first index processing server, the processor of the first index processing server executes operation of:

receiving the index generation request for the data which is stored in the storage apparatus included in each of the second object processing servers from the plurality of the object processing servers;

determining whether the identification information attached to the index generation request has been stored in the memory of the first index processing server, the memory storing identification information of data for which an index has already been generated;

determining, when the identification information attached to the index generation request is determined to be stored in the memory of the first index processing server, that the index of the data is not to be generated, and inhibiting the second index processing servers from generating the index; and determining, when the identification information attached to the index generation request has not been stored in the memory of the first index processing server, that the index of the data is to be generated, generating the index, and transmitting an index generation request for the data to the second index server, and the processor of each of the second index processing servers executes operation of:

receiving the index generation request for the data; and generating the index of the data.

* * * * *